US010273940B2

(12) United States Patent
Pan et al.

(10) Patent No.: US 10,273,940 B2
(45) Date of Patent: Apr. 30, 2019

(54) SYSTEM AND METHOD FOR DETECTING PITCH BEARING DAMAGE IN A WIND TURBINE

(71) Applicant: General Electric Company, Schenectady, NY (US)

(72) Inventors: Di Pan, Schenectady, NY (US); Liwei Hao, Schenectady, NY (US); Lijun He, Schenectady, NY (US); Stefan Grubic, Hermosa Beach, CA (US)

(73) Assignee: General Electric Company, Schenectady, NY (US)

( * ) Notice: Subject to any disclaimer, the term of this patent is extended or adjusted under 35 U.S.C. 154(b) by 168 days.

(21) Appl. No.: 15/152,664

(22) Filed: May 12, 2016

(65) Prior Publication Data

US 2017/0328349 A1 Nov. 16, 2017

(51) Int. Cl.
*G06F 11/00* (2006.01)
*F03D 17/00* (2016.01)
*F03D 7/02* (2006.01)
*F03D 80/70* (2016.01)

(52) U.S. Cl.
CPC ........... *F03D 17/00* (2016.05); *F03D 7/0224* (2013.01); *F03D 80/70* (2016.05); *F05B 2260/80* (2013.01); *Y02E 10/721* (2013.01); *Y02E 10/723* (2013.01)

(58) Field of Classification Search
CPC ..... Y02E 10/723; F03D 7/0224; F03D 17/00; F03D 7/042
USPC .................. 702/183, 182, 184, 185
See application file for complete search history.

(56) References Cited

U.S. PATENT DOCUMENTS

| 4,237,454 A | 12/1980 | Meyer |
| 8,043,048 B2 | 10/2011 | Daniels et al. |
| 8,994,359 B2 | 3/2015 | Neti et al. |

(Continued)

FOREIGN PATENT DOCUMENTS

| CN | 202547923 U | 11/2012 |
| EP | 262683 B1 | 7/2014 |
| WO | WO2012066107 A2 | 5/2012 |

OTHER PUBLICATIONS

Gong et al., "Bearing Fault Detection for Direct-Drive Wind Turbines via Stator Current Spectrum Analysis", Energy Conversion Congress and Exposition (ECCE), Sep. 17-22, 2011, pp. 313-318.

(Continued)

*Primary Examiner* — Edward Raymond
(74) *Attorney, Agent, or Firm* — GE Global Patent Operation; Nitin N. Joshi

(57) ABSTRACT

The present disclosure is directed to a system and method for detecting damage of a pitch bearing of a wind turbine. The pitch bearing is part of a pitch drive system having a plurality of pitch drive motors. The method includes measuring at least one electrical signal of the pitch drive system. The method also includes processing the electrical signal(s) of the pitch drive system and comparing the electrical signals of the pitch drive system with a baseline threshold. Thus, the method also includes determining whether damage is present in the pitch bearing based, at least in part, on the comparison, wherein the electrical signal(s) exceeding the baseline threshold is indicative of damage in the pitch bearing.

18 Claims, 11 Drawing Sheets

(56) References Cited

U.S. PATENT DOCUMENTS

| | | | |
|---|---|---|---|
| 2007/0267872 A1* | 11/2007 | Menke | F03D 7/0224 290/44 |
| 2011/0158805 A1* | 6/2011 | Miranda | F03D 7/0224 416/1 |
| 2012/0029892 A1* | 2/2012 | Thulke | F03D 7/045 703/7 |
| 2015/0177100 A1* | 6/2015 | Dietz | F03D 17/00 702/182 |
| 2015/0369698 A1 | 12/2015 | Sakaguchi et al. | |

OTHER PUBLICATIONS

Nielsen et al., "Analysis of pitch system data for condition monitoring", Wind Energy, vol. 17, Issue: 3, Mar. 2014, pp. 435-449.

* cited by examiner

SYSTEM AND METHOD FOR DETECTING PITCH BEARING DAMAGE IN A WIND TURBINE

STATEMENT REGARDING FEDERALLY SPONSORED RESEARCH AND DEVELOPMENT

This invention was made with Government support under contract DE-EE0006802 awarded by the United States Department of Energy. The Government has certain rights in the invention.

FIELD OF THE INVENTION

The present invention relates to generally to wind turbines, and more particularly, to a system and method for detecting pitch bearing damage in a wind turbine using electrical signature analysis.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Each of the rotor blades generally includes a pitch system located in the hub of the wind turbine that is used to safely operate the wind turbine and to extract the maximum amount of power under given wind conditions, i.e. by changing the angle of the rotor blades relative to the wind. Such pitch systems typically include a pitch motor, a pitch gearbox, and a pitch pinion. Further, the pitch motor is typically coupled to the pitch gearbox such that the pitch motor imparts mechanical force to the pitch gearbox. Similarly, the pitch gearbox may be coupled to the pitch pinion for rotation therewith. The pitch pinion may, in turn, be in rotational engagement with a pitch bearing coupled between the hub and one of the rotor blades such that rotation of the pitch pinion causes rotation of the pitch bearing. Thus, rotation of the pitch motor drives the pitch gearbox and the pitch pinion, thereby rotating the pitch bearing and the corresponding rotor blade about a pitch axis.

The mechanical components of wind turbine pitch systems operate under high stress and can fail prematurely over the lifetime of the wind turbine. A failure of the pitch bearing requires the wind turbine to be shut down and repaired. The repair process for the pitch bearing is very complex and can take an extended amount of time to be completed if not scheduled in time. Therefore, the operator of the wind turbine can incur substantial losses due to the downtime of the wind turbine caused by pitch bearing failure.

In view of the aforementioned, there is a need for a pitch bearing monitoring system that can give an early warning signal regarding the bearing condition such that the repair and maintenance process can be improved and the downtime and related losses can be minimized. Thus, the present disclosure is directed to a system and method for monitoring pitch bearing damage using electrical signature analysis that can detect and trend the deterioration in the bearing condition at an early stage.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for detecting damage of a pitch bearing of a wind turbine. The pitch bearing is part of a pitch control system having a plurality of pitch drive motors. The method includes measuring at least one electrical signal of the pitch control system. For example, in one embodiment, the method includes measuring an electrical signal of at least two pitch drive motors of the pitch control system. The method also includes processing the electrical signal(s) of the pitch drive motors and comparing each of the processed electrical signal(s) of the pitch drive system with a baseline threshold. Thus, the method also includes determining whether damage is present in the pitch bearing based, at least in part, on the comparison, wherein the electrical signal(s) varying from the baseline threshold by a predetermined or on-line calculated amount is indicative of damage in the pitch bearing.

In another aspect, the present disclosure is directed to a method for detecting damage of a component of a wind turbine. The component is part of a drive system having a plurality of drive motors. The method includes measuring at least one electrical signal of the drive system. Another step includes processing the electrical signal(s) of the pitch drive system. The method also includes comparing the electrical signal(s) of the drive system with a baseline threshold. Further, the method includes determining whether damage is present in the component based, at least in part, on the comparison, wherein the electrical signal(s) varying from the baseline threshold by a predetermined or on-line calculated amount is indicative of damage in the component.

In yet another aspect, the present disclosure is directed to a system for detecting damage of a slewing ring bearing of a wind turbine. The slewing ring bearing is part of a drive control system having a plurality of drive motors. The system includes one or more sensors configured to measure at least one electrical signal of the drive control system and a controller communicatively coupled with the one or more sensors. The controller includes at least one processor configured to perform one or more operations. The operations may include but are not limited to processing the electrical signal(s) of the drive system, comparing each of the processed electrical signal(s) of the drive system with a baseline threshold and determining whether damage is present in the slewing ring bearing based, at least in part, on the comparison, wherein the electrical signal(s) varying from the baseline threshold by a predetermined or on-line calculated amount is indicative of damage in the slewing ring bearing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
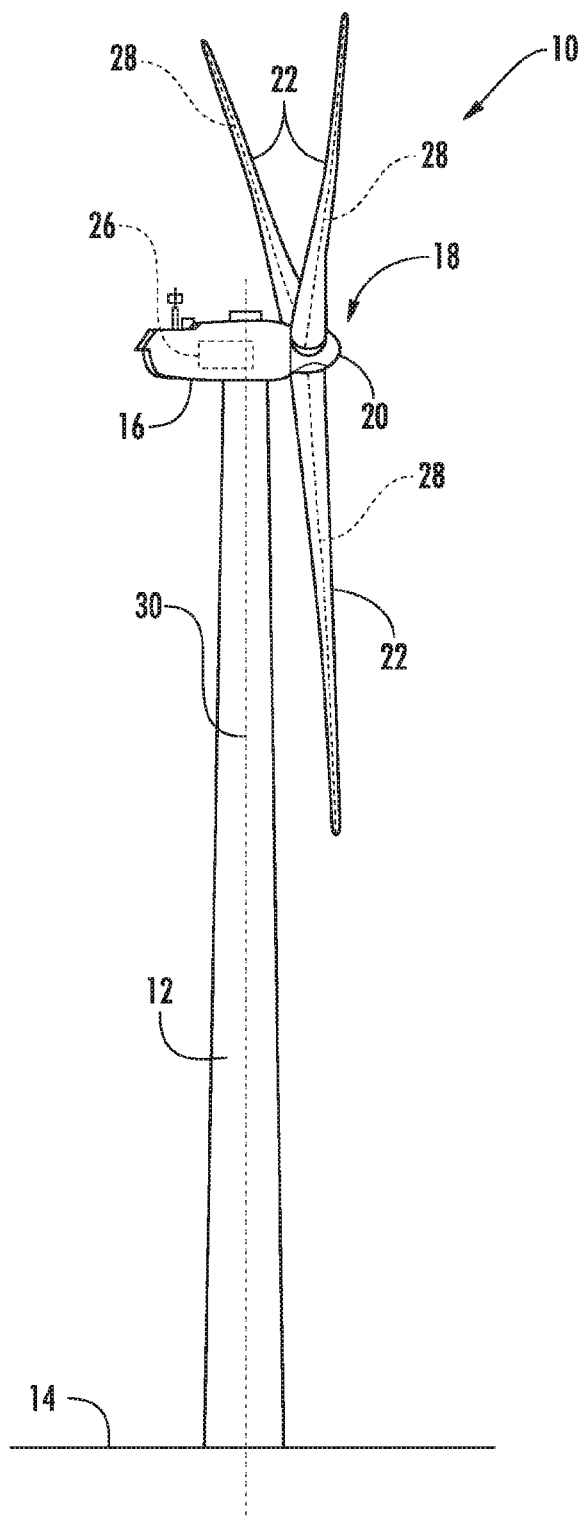
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for detecting damage of a wind turbine, or more particularly of a slewing ring bearing such as a pitch bearing or a yaw bearing. As used herein, a slewing ring bearing generally refers to a rotational rolling-element bearing that generally supports a heavy but slow-turning load. For example, slewing ring bearings generally include an inner race and an outer race rotatable with respect the inner race via one or more rolling elements. In one embodiment, for example, the pitch bearing may be part of a pitch control system having a plurality of pitch drive motors. Thus, in such embodiments, the method includes measuring at least one electrical signal of the pitch control system. Further, the method includes processing the electrical signal(s) of the pitch drive motors and comparing each of the processed electrical signal(s) of the pitch drive motors to a baseline (e.g. predetermined or on-line calculated or on line calculated). Thus, the method also includes determining whether damage is present in the pitch bearing based, at least in part, on the comparison, wherein at least one of the electrical signal(s) varying from the baseline threshold by a predetermined or on-line calculated amount is indicative of damage in the pitch bearing.

The present disclosure provides many advantages not present in the prior art. For example, the system and method of the present disclosure enables continuous monitoring of the health condition of a pitch system of a wind turbine. Thus, a wind turbine operator can schedule needed services in advance of pitch bearing failure to significantly reduce downtime of the turbine. In addition, the cost of operation and warranty of the wind turbine can be reduced due to better planning and resource allocation.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
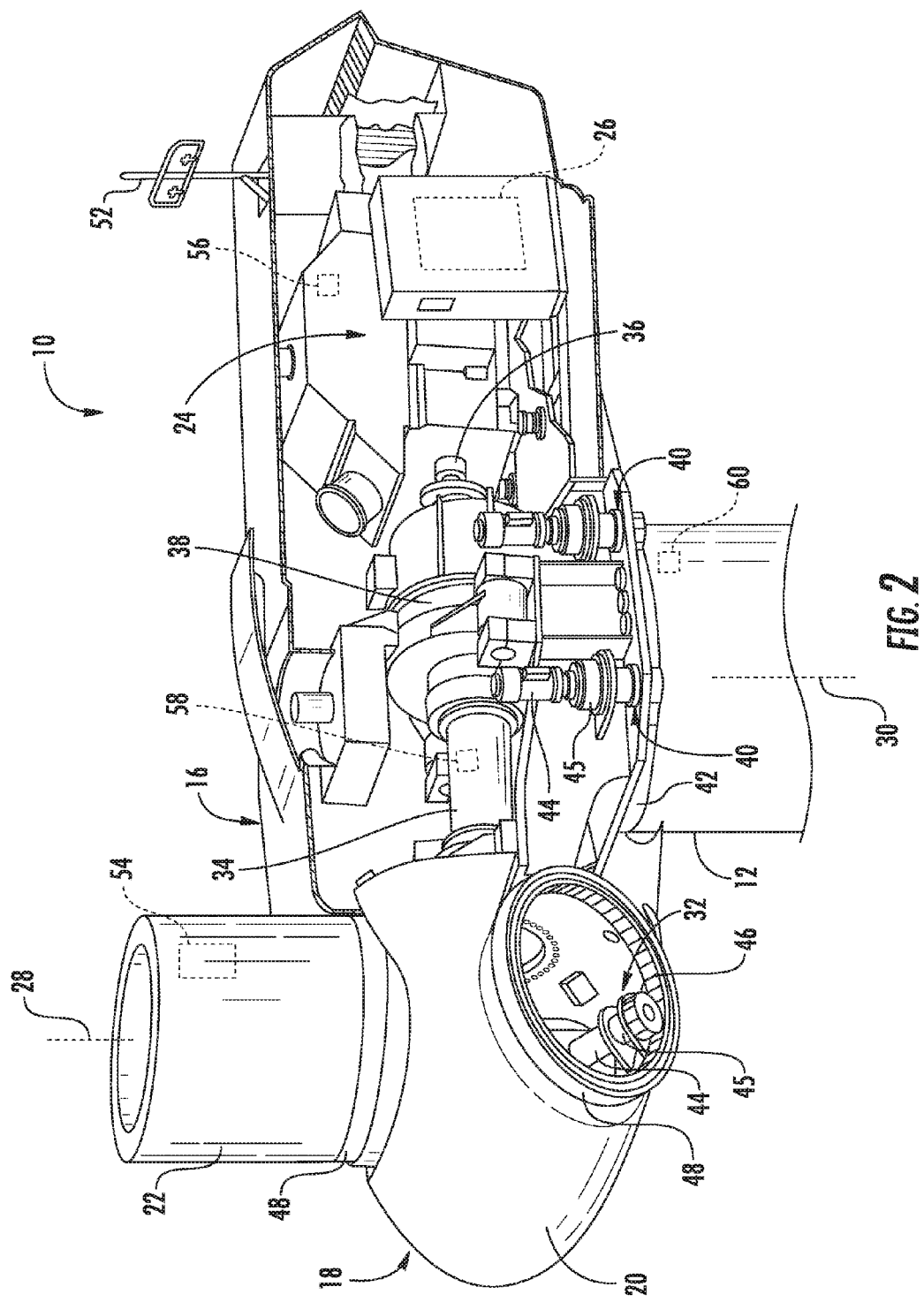
FIG. 2 illustrates a detailed, perspective view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may include a pitch drive system 32 configured to change the angle of the blades 22 relative to the wind (e.g., by engaging a pitch bearing 48 of the wind turbine 10). Further, each pitch drive system 32 may include a pitch drive motor 44 (e.g., any suitable electric motor), a pitch drive gearbox 45, and a pitch drive pinion 46. In such embodiments, the pitch drive motor 44 may be coupled to the pitch drive gearbox 45 so that the pitch drive motor 44 imparts mechanical force to the pitch drive gearbox 45. Similarly, the pitch drive gearbox 45 may be coupled to the pitch drive pinion 46 for rotation therewith. The pitch drive pinion 46 may, in turn, be in rotational engagement with a pitch bearing 48 coupled between the hub 20 and one of the rotor blades 22 such that rotation of the pitch drive pinion 46 causes rotation of the pitch bearing 48. Thus, in such embodiments, rotation of the pitch drive motor 44 drives the pitch drive gearbox 45 and the pitch drive pinion 46, thereby rotating the pitch bearing 48 and the corresponding rotor blade 22 about the pitch axis 28. Similarly, the wind turbine 10 may include one or more yaw drive systems 40 communicatively coupled to the wind turbine controller 26, with each yaw drive system(s) 40 being configured to rotate the yaw bearing 42 and thus the nacelle 16 about the yaw axis 30.

In addition, the wind turbine 10 may also include one or more sensors 52 for monitoring various wind conditions for the wind turbine 10. For example, as shown in FIG. 2, the wind direction, wind speed, or any other suitable wind condition close to the wind turbine 10 may be measured, such as through use of a suitable weather sensor 52. Suitable weather sensors 52 include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art.

More specifically, as shown, the wind turbine 10 may also include additional sensors for monitoring various electrical signals of the turbine. Such sensors may include blade sensors 54 for monitoring the rotor blades 22; generator sensors 56 for monitoring the torque, the rotational speed, the acceleration and/or the power output of the generator 24; and/or shaft sensors 58 for measuring the loads acting on the rotor shaft 32 and/or the rotational speed of the rotor shaft 32. Additionally, the wind turbine 10 may include one or more tower sensors 60 for measuring the loads transmitted through the tower 12 and/or the acceleration of the tower 12. Of course, the wind turbine 10 may further include various other suitable sensors for measuring any other suitable loading and/or operating conditions of the wind turbine 10.

Figure 3:
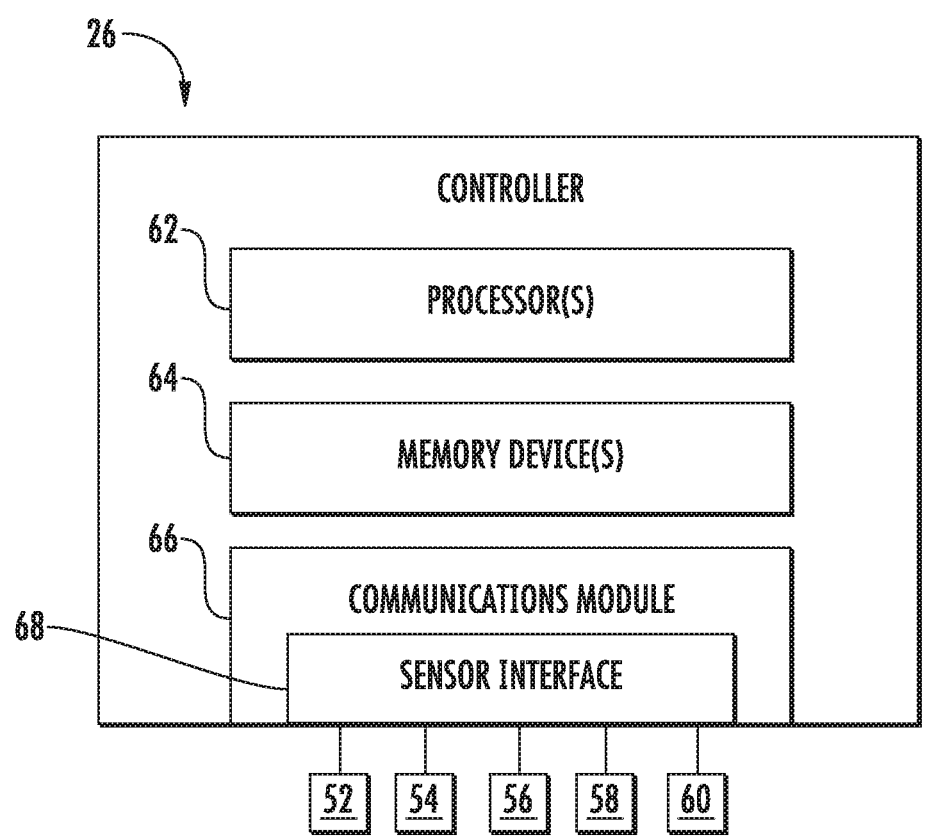
FIG. 3 illustrates a block diagram of one embodiment of suitable components that may be included in a controller of the wind turbine according to the present disclosure.

Referring now to FIG. 3, a block diagram of one embodiment of suitable components that may be included within the controller 26 in accordance with aspects of the present subject matter is illustrated. As shown, the controller 26 may include one or more processor(s) 62 and associated memory device(s) 64 configured to perform a variety of computer-implemented functions (e.g., performing the methods, steps, calculations and the like and storing relevant data as disclosed herein). Additionally, the controller 26 may also include a communications module 66 to facilitate communications between the controller 26 and the various components of the wind turbine 10. Further, the communications module 66 may include a sensor interface 68 (e.g., one or more analog-to-digital converters) to permit signals transmitted from the sensors) to be converted into signals that can be understood and processed by the processors 62. It should be appreciated that the sensors as described herein may be communicatively coupled to the communications module 66 using any suitable means. For example, the sensors may be coupled to the sensor interface 68 via a wired connection. However, in alternative embodiments, the sensors may be coupled to the sensor interface 68 via a wireless connection, such as by using any suitable wireless communications protocol known in the art.

Figure 4:
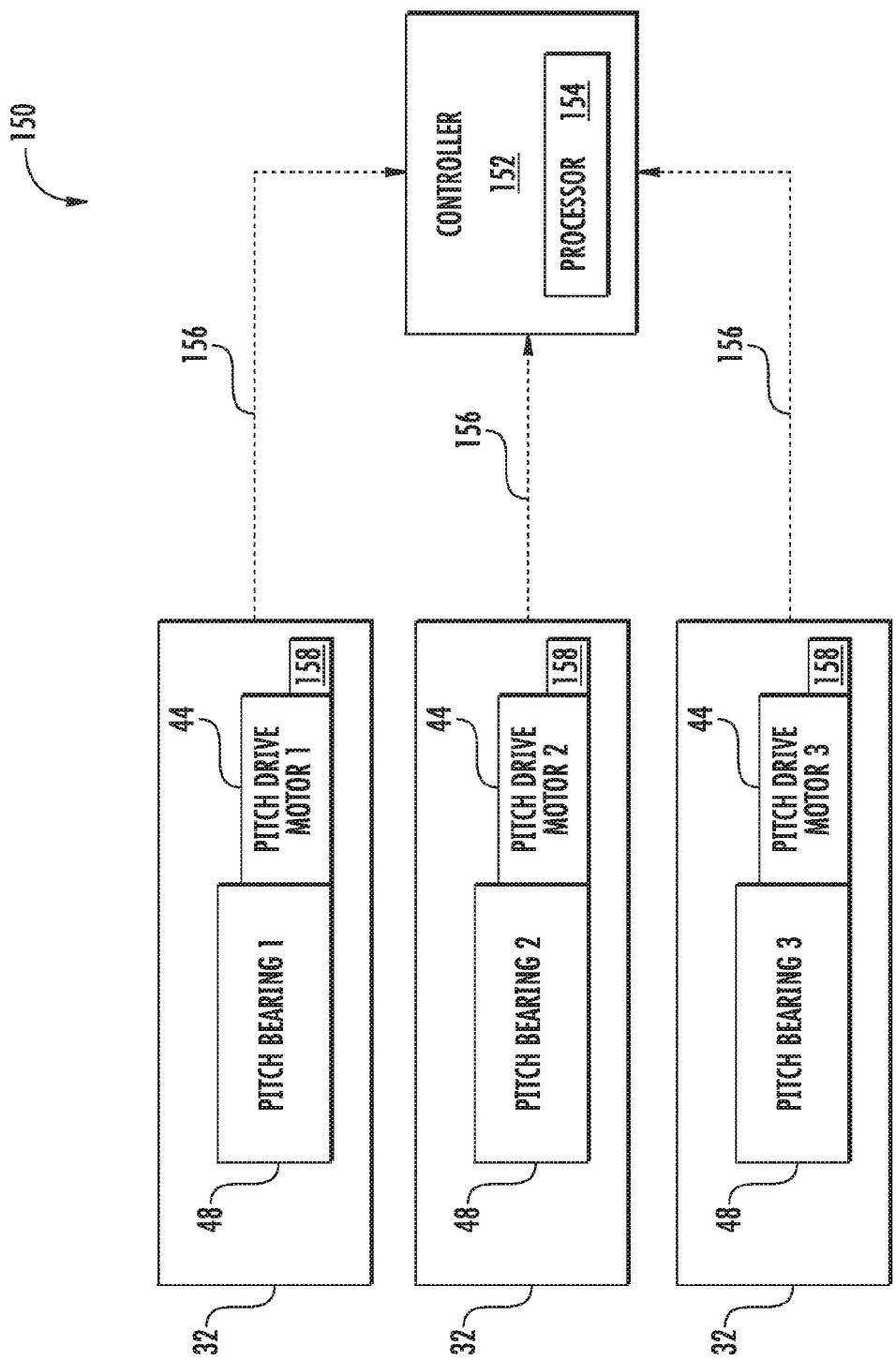
FIG. 4 illustrates a schematic diagram of one embodiment of a system for detecting damage of a pitch bearing of a wind turbine according to the present disclosure.

Referring now to FIGS. 4-11, the system and method of the present disclosure is generally illustrated and described with respect to a pitch bearing. However, it should be understood that the system and method of the present disclosure may also apply to yaw bearings, as well as any other similar components that may be utilized in the wind turbine 10. More specifically, as shown in FIG. 4, a schematic diagram of one embodiment of a system 150, e.g. a pitch control system, for detecting damage of a slewing ring bearing (e.g. the pitch bearing 48 or the yaw bearing 42) of a wind turbine 10 is illustrated. For example, as described above in reference to FIG. 1, the wind turbine 10 may include three pitch bearings 48, i.e. one configured with each of the rotor blades 22. Further, as explained in reference to FIG. 2, each of the pitch bearings 48 may include a pitch drive motor 44. In one embodiment, the pitch drive motors 44 may be direct current (DC) pitch drive motors. Alternatively, the pitch control system 150 is also configured to operate with alternating current (AC) pitch drive motors.

In addition, the system 150 may include one or more sensors 158 configured to measure an electrical signal 156 of the pitch drive motors 44. It should be understood that the sensors 158 may be any suitable sensors, such as the sensors described herein. Further, in one embodiment, the electrical signal(s) 156 may include an electric current, a voltage, a torque component, a direct torque measurement, or a torque or current command. Typically, there is not a direct torque measurement readily available, therefore, the motor current measurementss are usually easier to obtain and have a higher accuracy. Thus, in a preferred method, the system 150 uses electric current as the measured electrical signal. However, if a torque measurement and/or a torque or current command is available, it can be used in place of the motor currents where desired. Further, the motor currents can be measured through an additional data acquisition system or using the converter. In addition, as shown, the system 150 may also include a controller 152 communicatively coupled with the one or more sensors 158, which may be synonymous with turbine controller 26, or may be any other suitable controller integral with or separate from the turbine controller 26. Thus, the controller 152 may be configured similar to the turbine controller 26, e.g. having at least one processor 154, etc.

Figure 5:
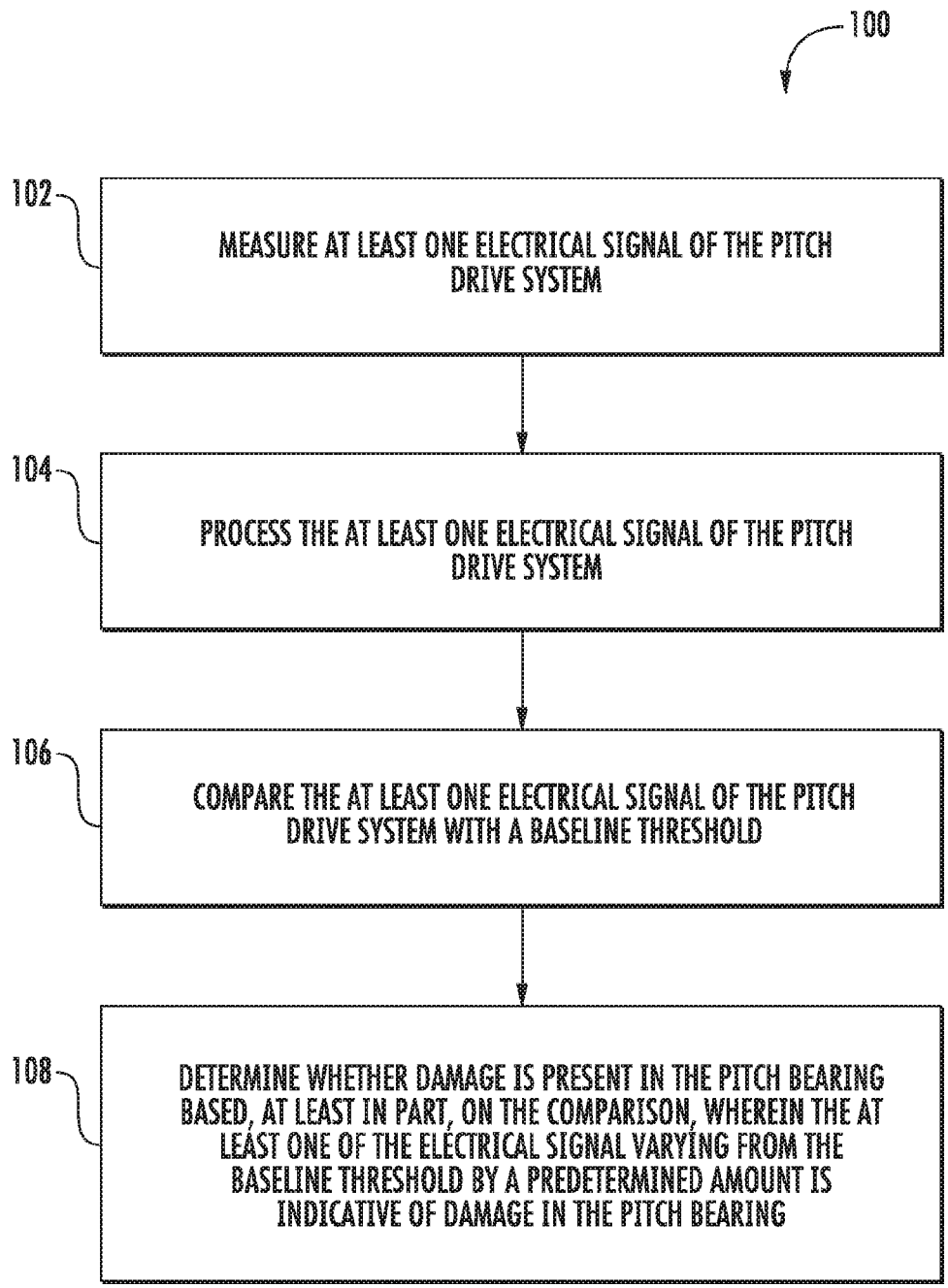
FIG. 5 illustrates a flow diagram of one embodiment of a method for detecting damage of a pitch bearing of a wind turbine according to the present disclosure.

Referring now to FIG. 5, a flow diagram of one embodiment of a method 100 that may be implemented by the controller 152 for detecting damage of one of the pitch bearings 48 of the wind turbine 10 is illustrated. Thus, in one embodiment, as shown at 102, the method 100 may include measuring at least one electrical signal 156 of the pitch drive motors 44. For example, in one embodiment, for wind turbines having three rotor blades 22 and three pitch drive motors 44 (i.e. one for rotating each pitch bearing 48 of each rotor blade 22) as shown in FIG. 1, the method 100 may include measuring an electrical signal 156 for the three pitch drive motors 44. Further, in certain embodiments, each of the pitch drive motors 44 may include a direct current (DC) pitch drive motor. In such an embodiment, the electrical signal(s) may include electric currents of the DC motors, such as DC armature currents. Further, when the pitch motors are AC motors, the torque current component can be extracted and used in a similar manner as in DC pitch motors.

As shown at 104, the method 100 may also include processing the electrical signal(s) of the pitch drive motors. Further, as shown at 106, the method 100 may include comparing the electrical signal(s) 156 of the pitch drive motors 44 with a baseline threshold. For example, in certain embodiments, the electrical signal(s) 156 may be directly compared to the baseline threshold. Alternatively, as mentioned, the electrical signals 156 may be manipulated or processed before being compared to the baseline threshold as explained in more detail below. Further, in certain embodiments, the baseline threshold can be predetermined and stored and/or calculated on line from the measured signals. As shown at 108, the method 100 also includes determining whether damage is present in the pitch bearing 48 based, at least in part, on the comparison, wherein the electrical signal(s) 156 varying from the baseline threshold by a predetermined or on-line calculated amount is indicative of damage in the pitch bearing 48. If damage is present in the pitch bearing 48, a signal may be generated and sent to a user. As such, the user or operator can schedule inspection and/or maintenance of the pitch bearing 48. Such preventative maintenance may prevent catastrophic failure of the pitch bearing 48, thereby saving the operator both time and money associated with maintenance and/or repair downtime.

More specifically, in a preferred embodiment, the system 150 may manipulate the electrical signal(s) 156 based on symmetrical component analysis, which is generally used for the analysis of three phase alternative current (AC) systems. Since the pitch drive motors 44 are typically single phase direct current (DC) motors, symmetrical component analysis cannot be applied directly to each motor 44. However, in certain embodiments, the system 150 of the present disclosure forms a system that can be considered a three-phase system comprising the three separate pitch drive motors 44 (i.e. one for each rotor blade 22) that can be used to detect pitch bearing health. Therefore, symmetrical component analysis can be applied to the three axes of the pitch system. If the pitch bearing 48 is in a healthy condition, then the three pitch drive motors 44 operate in a substantially balanced manner but shifted by 120 degrees. Therefore, the negative sequence component of the system 150 formed by the three pitch drive motors 44 is negligibly small. When the pitch bearing 48 develops a defect, the electric current of the motor that is driving the defective bearing 48 will increase and therefore, the asymmetry between the pitch drive motors 44 and the negative sequence component will increase.

Figure 6:
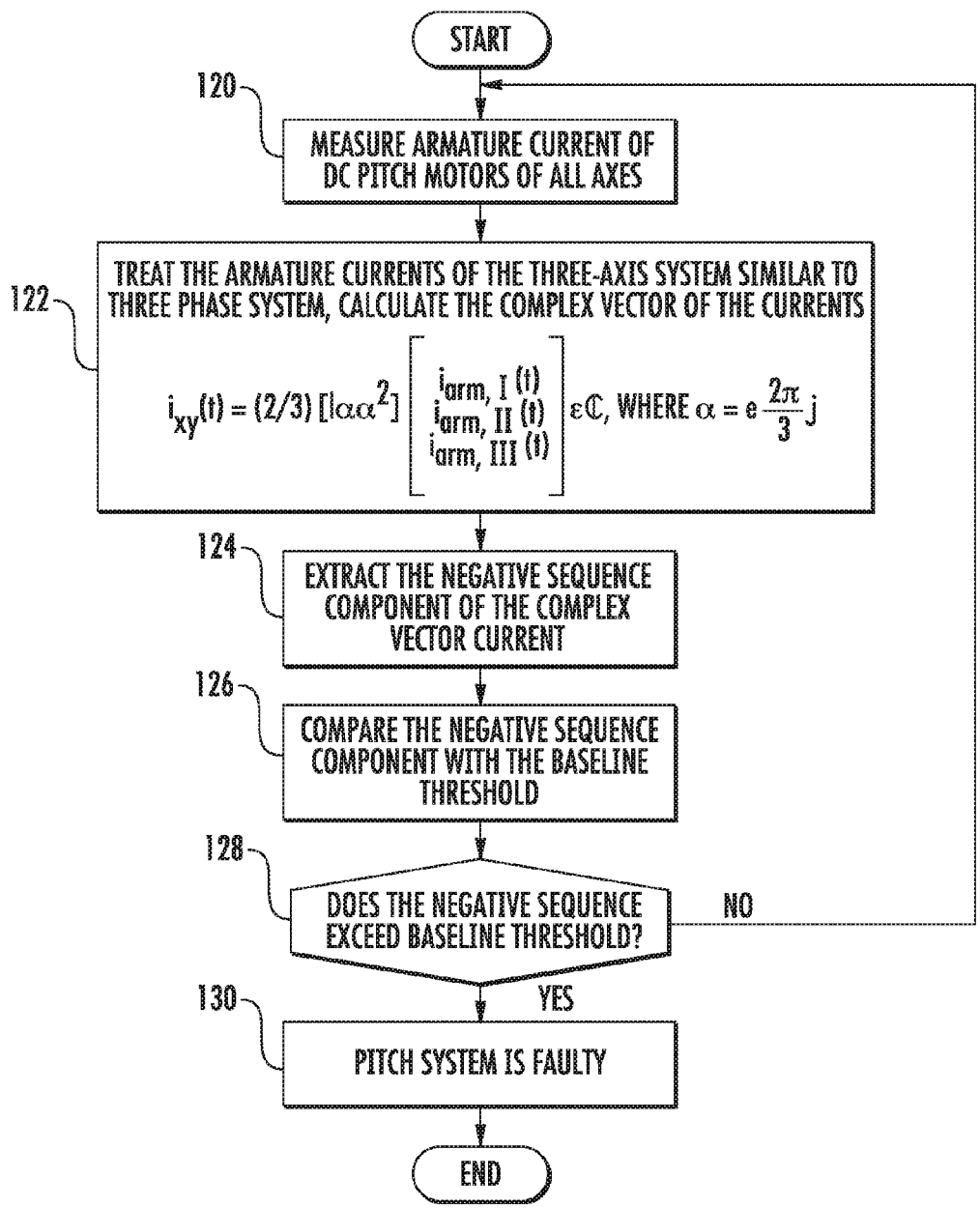
FIG. 6 illustrates a flow chart of one embodiment of symmetrical component analysis for DC pitch motors according to the present disclosure.

More specifically, as shown FIG. 6, a flow chart of the symmetrical component analysis for DC motors is illustrated. Further, as shown at 120, the analysis may include measuring armature current of DC pitch motors of all axes. Moreover, as shown at 122, the analysis may include treating the armature currents of the three-axis system similar to a three-phase system and calculating a complex vector of the electrical signals 156. For example, as shown in Equation (1) below, to perform a symmetrical component analysis, the complex current vector may be calculated as follows:

$$i_{xy}(t) = \left(\frac{2}{3}\right)[1 \quad \alpha \quad \alpha^2] \begin{bmatrix} i_{arm,I}(t) \\ i_{arm,II}(t) \\ i_{arm,III}(t) \end{bmatrix} \in \mathbb{C} \quad \text{Equation (1)}$$

where $$\alpha = e^{\frac{2\pi}{3}j},$$

and $i_{arm,I}(t)$, $i_{arm,II}(t)$, and $i_{arm,III}(t)$ are the time domain armature currents of the three pitch motors.

As shown at 124, the analysis includes extracting or retrieving a negative sequence component from the complex vector. As such, in a further embodiment, the complex vector may be transferred from the time domain into the frequency domain, for example, by applying a Fast-Fourier transform (FFT) or by a spectral density estimation. Still another method of obtaining negative sequence components is by reference frame transformation in real time.

The dominant AC frequency component of the complex pitch current $f_I$ may also be determined, which is the largest AC component in the frequency spectrum of the pitch current vector $I_{PI}$. The negative sequence component of the pitch current vector $I-_{PI}$ can simply be found by going to the negative of the dominant AC frequency component $f_I$. As shown at 126, the magnitude of the negative sequence component of the current pitch vector can directly be used as a fault indicator, i.e. by comparing the negative sequence component with the baseline threshold at shown at 126. In certain embodiments, the larger the negative sequence component the larger the probability of a damaged pitch bearing.

More specifically, as shown at 128 and 130, if the negative sequence component exceeds the baseline threshold, damage is likely present in the pitch bearing 48. In contrast, if the negative sequence component is less than the baseline threshold, damage is likely not present in the pitch bearing 48. In certain embodiments, if the electrical signals 156 do not exceed the baseline threshold, the method 100 may include continuously monitoring the electrical signals 156 of the pitch drive motors 44 so as to detect future defects.

Figure 7:
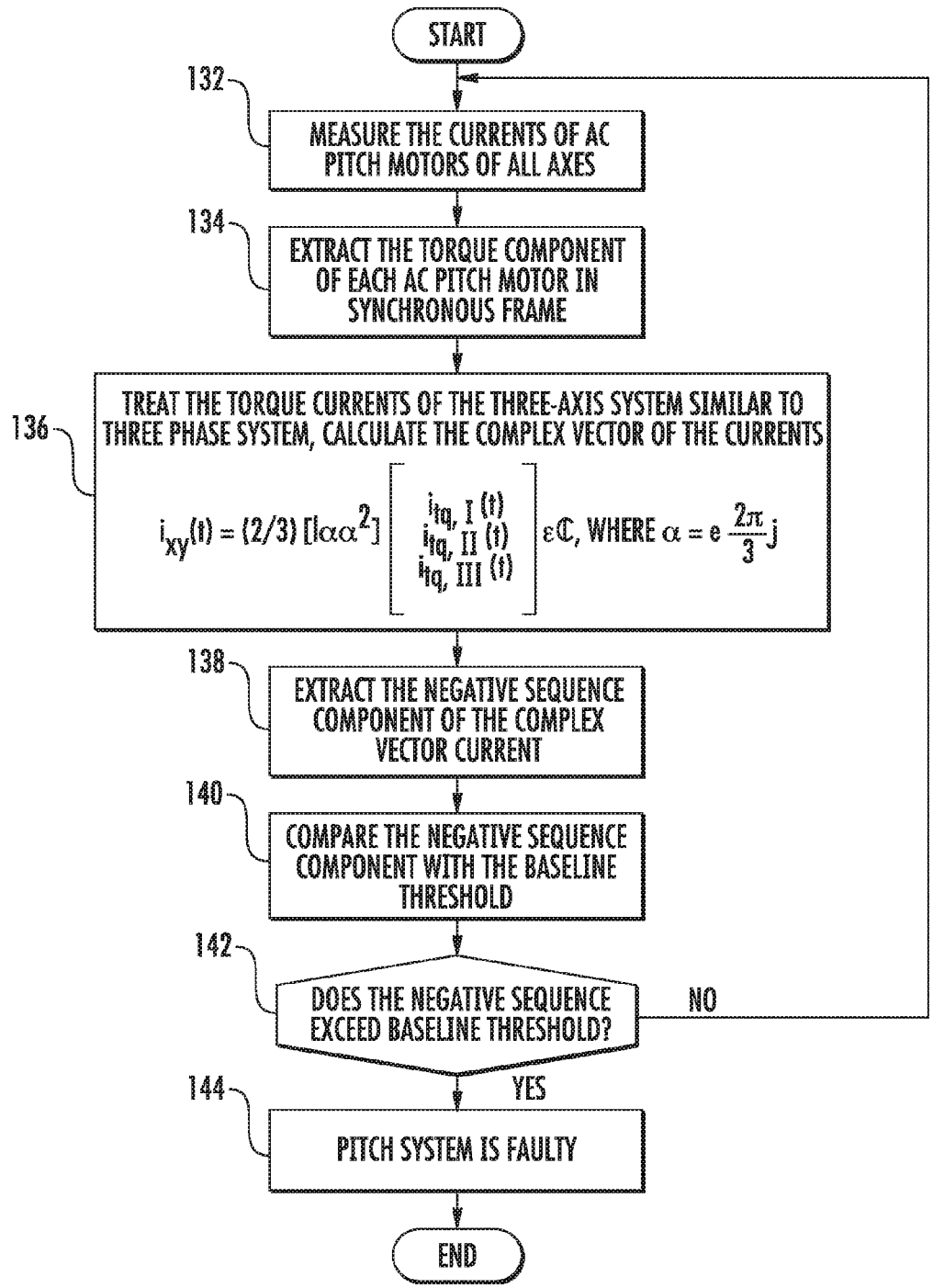
FIG. 7 illustrates a flow chart of one embodiment of symmetrical component analysis for AC pitch motors according to the present disclosure.

Alternatively, as shown in FIG. 7, a flow chart of the symmetrical component analysis for AC pitch motors is illustrated. Further, as shown at 132, the analysis may include measuring the currents of the AC pitch motors of all axes. Moreover, as shown at 134, the analysis may include extracting the torque component of each AC pitch motor in the synchronous frame. As shown at 136, the analysis includes treating the torque currents of the three-axis system similar to a three-phase system and calculating a complex vector of the electrical signals 156. For example, as shown in Equation (2) below, to perform a symmetrical component analysis, the complex current vector may be calculated as follows:

$$i_{xy}(t) = \left(\frac{2}{3}\right)[1 \quad \alpha \quad \alpha^2] \begin{bmatrix} i_{tq,I}(t) \\ i_{tq,II}(t) \\ i_{tq,III}(t) \end{bmatrix} \in \mathbb{C} \quad \text{Equation (2)}$$

where $$\alpha = e^{\frac{2\pi}{3}j},$$

and $i_{tq,I}(t)$, $i_{tq,II}(t)$, and $i_{tq,III}(t)$ are the time domain armature currents of the three pitch motors.

As shown at 138, the analysis further includes retrieving a negative sequence component from the complex vector as described herein. The magnitude of the negative sequence component of the current pitch vector can directly be used as a fault indicator. For example, as shown at 140, the analysis includes comparing the negative sequence component with a baseline threshold. In certain embodiments, the larger the negative sequence component the larger the probability of a damaged pitch bearing.

More specifically, as shown at 142 and 144, if the negative sequence component exceeds the baseline threshold, damage is likely present in the pitch bearing 48. In contrast, if the negative sequence component is less than the baseline threshold, damage is likely not present in the pitch bearing 48. In certain embodiments, if the electrical signals 156 do not exceed the baseline threshold, the method 100 may include continuously monitoring the electrical signals 156 of the pitch drive motors 44 so as to detect future defects.

In alternative embodiments, rather than using a symmetrical component analysis, the electrical signals 156 may be manipulated by determining a root-mean-square (RMS) value for each of the electrical signals. In addition, the electrical signals 156 may be manipulated by averaging the electrical signal for each pitch drive motor 44 over a predetermined or on-line calculated number of rotor rotations, e.g. one rotation, of the wind turbine 10. In further embodiments, the electrical signals 156 may be manipulated by squaring each of the signals, multiplying each of the signals, filtering the signals, or any other suitable manipulation that can be applied to the electrical signals before the electrical signals are compared to the baseline threshold or combinations thereof.

Figure 8:
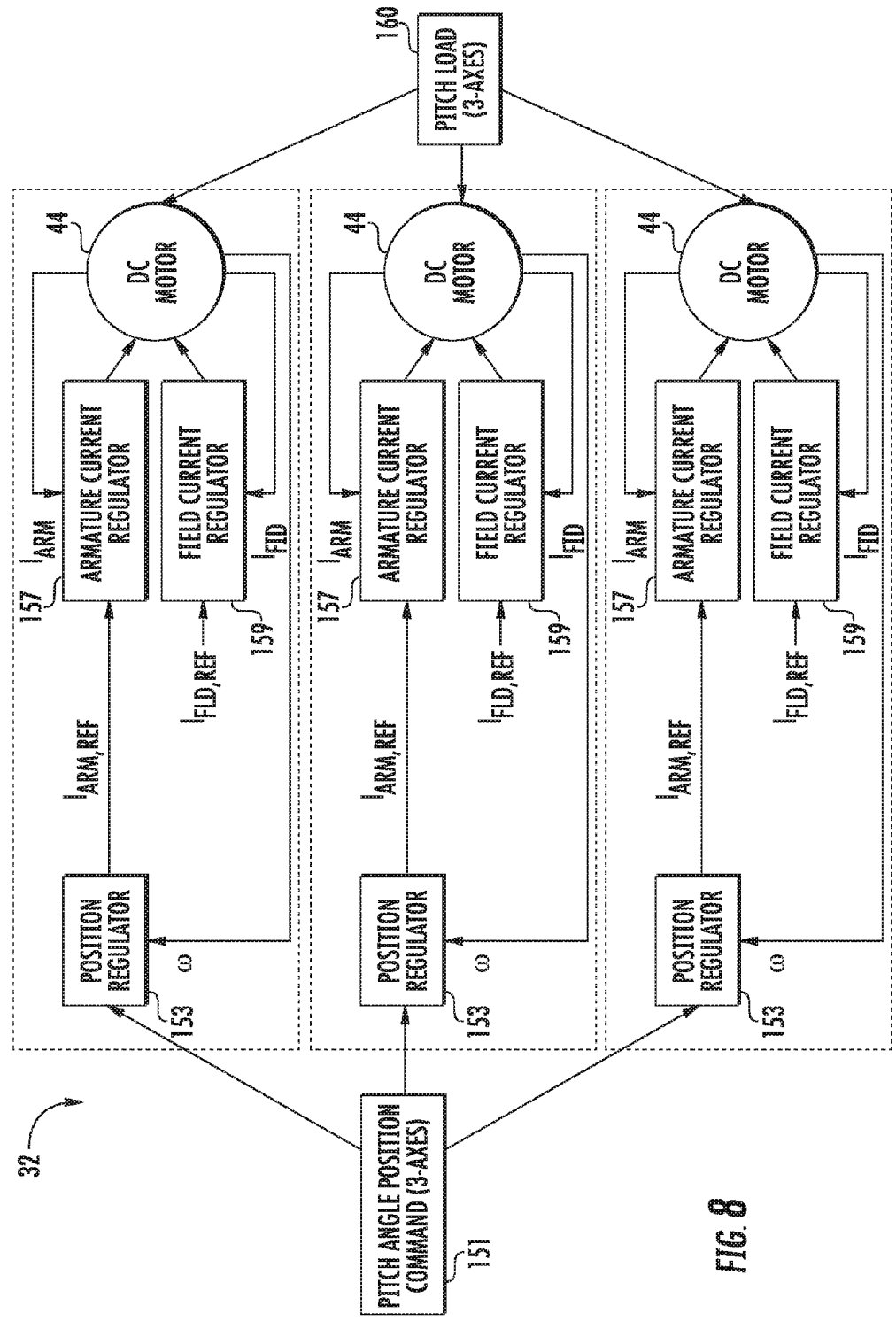
FIG. 8 illustrates a block diagram of one embodiment of a three-axis pitch control system according to the present disclosure.
Figure 9:
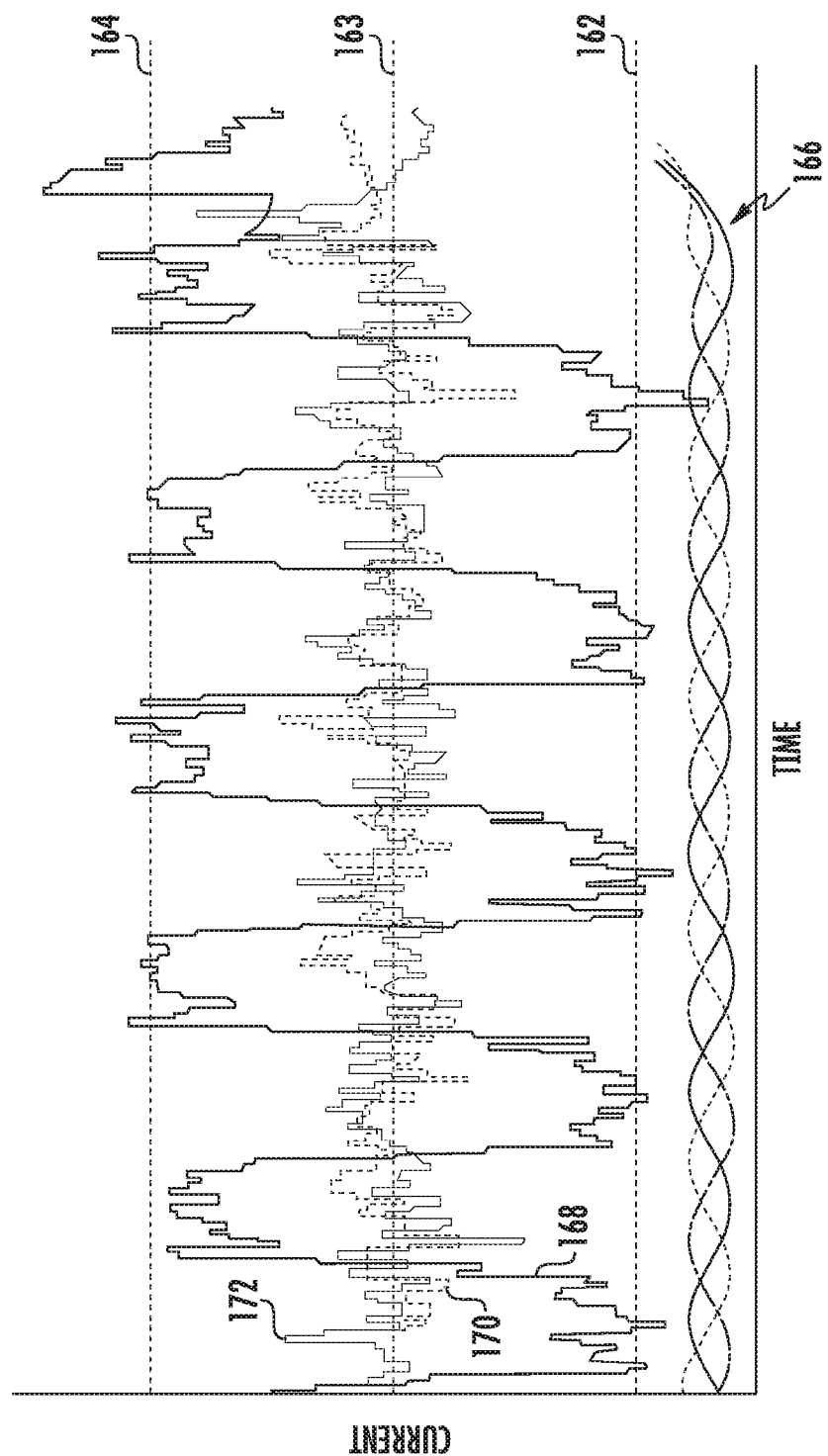
FIG. 9 illustrates a graph of one embodiment of field data of pitch drive motors from a damaged pitch bearing according to the present disclosure.

Referring now to FIGS. 8 and 9, a block diagram of the three-axis pitch drive system 32 and a corresponding graph of field data from the pitch drive motors 44 are illustrated, respectively. More specifically, as shown in FIG. 8, the pitch drive system 32 includes three DC pitch drive motors 44 (i.e. one for pitch bearing 48), where two of the pitch bearings 48 are healthy and one of the pitch bearings 48 is damaged as shown by the altered load torque experienced by one of the pitch drive motors 44, which is reflected in the motor armature current (FIG. 9). Further, as shown in FIG. 8, the pitch drive system 32 is configured to apply a pitch angle position command 151 to each of the pitch drive motors 44, which may be filtered and regulated with respect to speed, e.g. via position regulators 153. The position may further be regulated by regulating armature and field current, e.g. via armature current regulators 157 and field current regulators 159. Further, each of the regulators may include a reference as an input (e.g. $\omega_{ref}$, $I_{arm,ref}$, $I_{fld,ref}$ etc.). Thus, a pitch motor mechanical load profile can be also applied to each of the pitch drive motors 44. It should be understood that the pitch load is a load input to the control system, not the outcome of the control system.

Thus, as shown in FIG. 9, the three-axis pitch position angle 166 generated by the pitch drive motors 44 of FIG. 6 generate field data that can be used to detect pitch bearing health. More specifically, as shown, the minimum current 162, the average current 163, and the maximum current 164 are illustrated as references points, respectively, with curves 170, 172 representing healthy pitch bearings and curve 168 representing a damaged pitch bearing. Further, as shown in FIG. 9, historical field data is illustrated to properly scale the currents in the simulation and confirm the validity of the underlying assumptions for the simulation.

Figure 10:
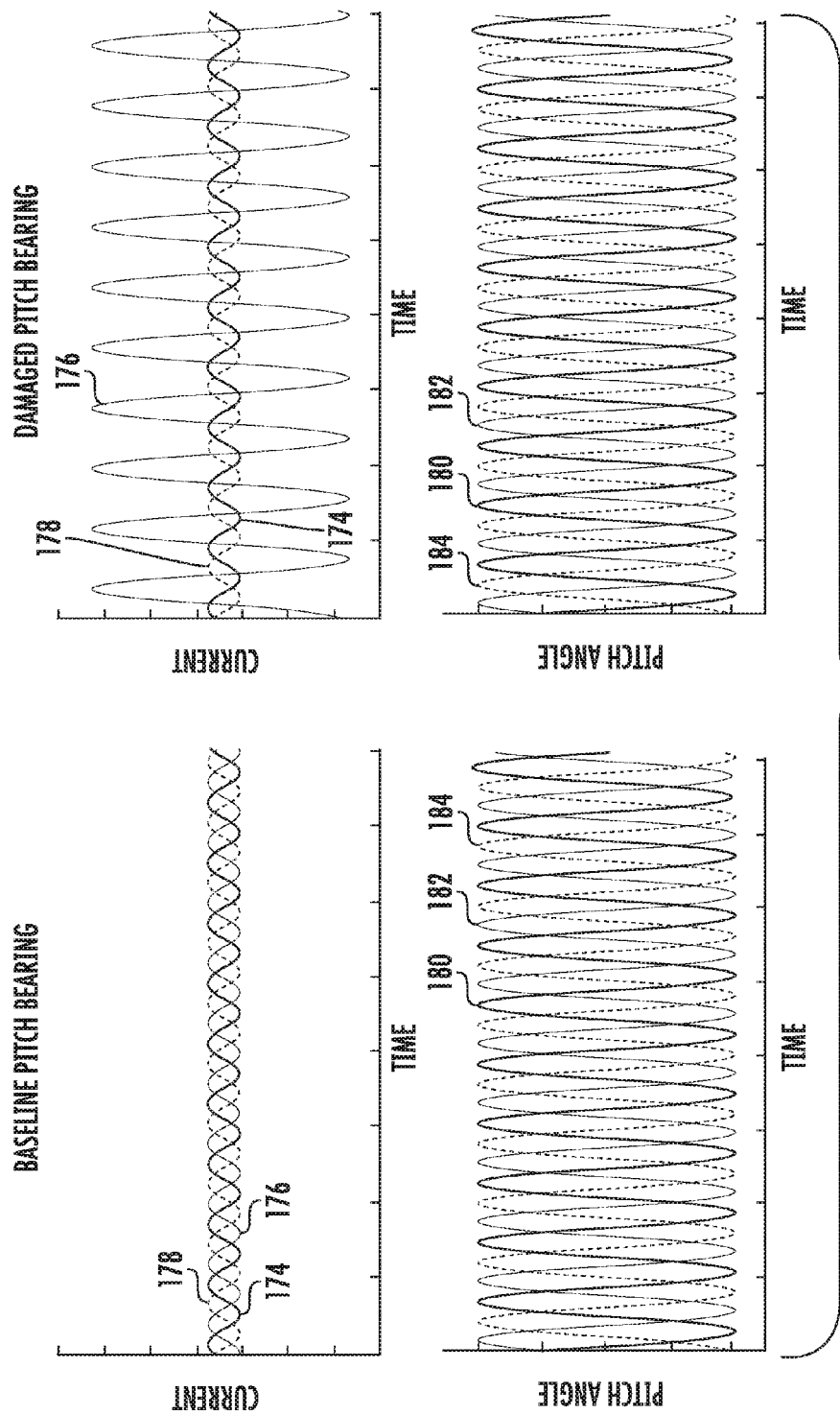
FIG. 10 illustrates various graphs of one embodiment of time domain waveforms of pitch motor currents for a healthy and damaged pitch bearing according to the present disclosure.
Figure 11:
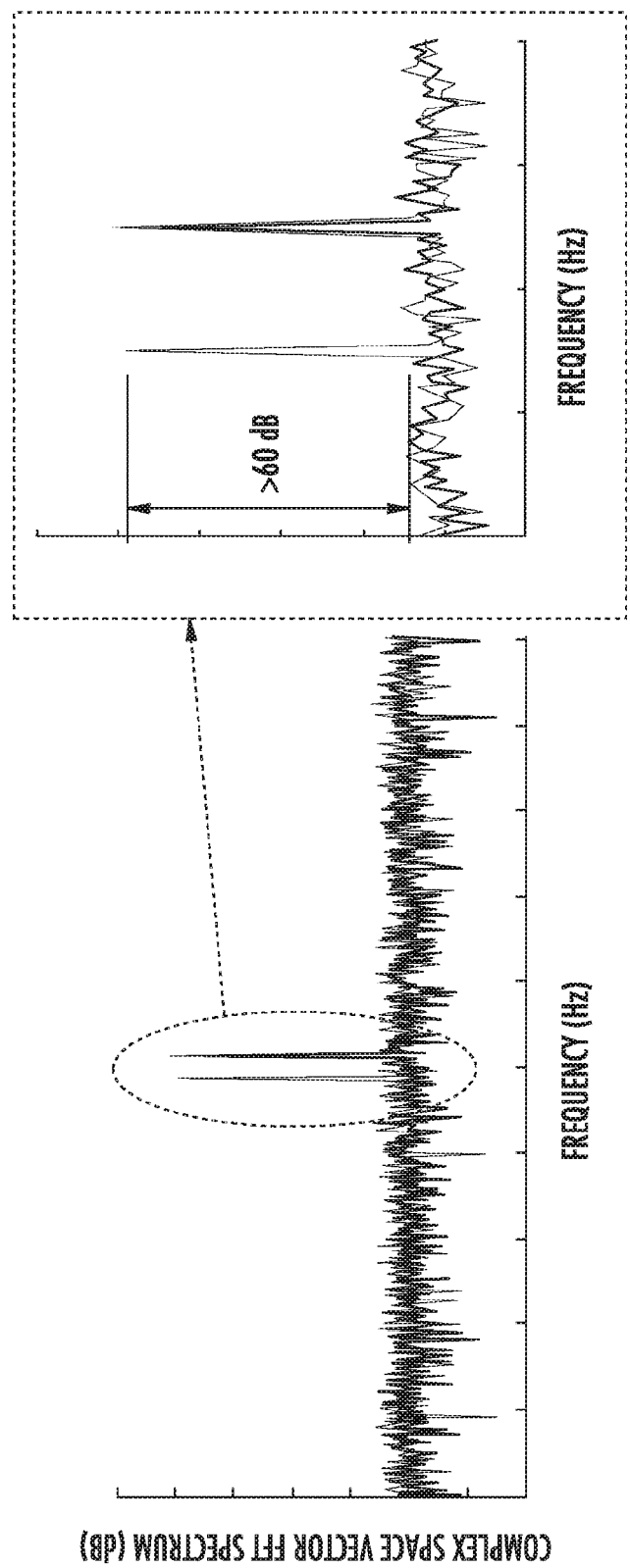
FIG. 11 illustrates various graphs of one embodiment of symmetrical component analysis of a complex pitch current vector for the healthy and damaged pitch bearing of FIG. 10.

Referring now to FIGS. 10 and 11, the time domain data of a heathy (left) and a damaged pitch bearing (right) are shown (FIG. 10) as well as a graph of the comparison of a damaged bearing with three healthy bearings through symmetrical component analysis (FIG. 11). For example, as shown in FIG. 10, the current 174, 176, and 178 and pitch angle 180, 182, 184 for three healthy or baseline pitch bearings (left graphs) are illustrated as compared to the current and pitch angle for a damaged pitch bearing (right graphs). Further, as shown in FIG. 11, the graph illustrates an increase of the negative sequence component of the dominant AC portion. In this case, the increase in the fault indicating signature is greater than about 60 dB, which is an increase in the asymmetry of three orders of magnitude. Thus, the comparison indicates a clear detection of a damaged pitch bearing 48. It should be understood that the system 150 is configured to indicate damage much earlier and the illustration of 60 dB represents later stage damage, which is provided for illustration purposes only.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting damage of a pitch bearing of a wind turbine, the pitch bearing being part of a pitch drive system having a plurality of pitch drive motors, the method comprising:
   measuring at least one electrical signal of the pitch drive system;
   processing the at least one electrical signal of the pitch drive system;
   comparing the at least one electrical signal of the pitch drive system with a baseline threshold;
   determining whether damage is present in the pitch bearing based, at least in part, on the comparison, wherein the at least one electrical signal varying from the baseline threshold by a predetermined or on-line calculated amount is indicative of damage in the pitch bearing;
   wherein, if the electrical signal does not exceed the baseline threshold, the method further comprises continuously monitoring at least one electrical signal of the pitch drive system; and
   wherein the method further comprises generating a signal indicative of damage in the pitch bearing and performing a maintenance of the pitch bearing based on the generated signal.

2. The method of claim 1, wherein the at least one electrical signal comprises at least one of an electric current, a voltage, a torque component, a direct torque measurement, or a torque or current command.

3. The method of claim 1, further comprising retrieving a negative sequence component, comparing the negative sequence component with the baseline threshold, and determining whether damage is present in the pitch bearing based on the comparison.

4. The method of claim 3, wherein if the negative sequence component exceeds the baseline threshold, damage is likely present in the pitch bearing.

5. The method of claim 1, further comprising determining the baseline threshold based, at least in part, on historical data and determining a trend between the electrical signals and the baseline threshold.

6. The method of claim 1, wherein the pitch drive system comprises at least three pitch drive motors, each of the pitch drive motors configured with a rotor blade of the wind turbine.

7. The method of claim 1, wherein processing the at least one electrical signal of the pitch drive system further comprises at least one of determining a root-mean-square value for a plurality of the electrical signals, averaging the electrical signal for each pitch drive motor over a predetermined or on-line calculated number of rotor rotations of the wind turbine, squaring each of the electrical signals, filtering each of the electrical signals, or multiplying each of the electrical signals.

8. The method of claim 1, wherein each of the pitch drive motors comprises a direct current (DC) pitch drive motor.

9. The method of claim 1, wherein each of the pitch drive motors comprises an alternating current (AC) pitch drive motor.

10. A method for detecting damage of a component of a wind turbine, the component being part of a drive system having a plurality of drive motors, the method comprising:
    measuring at least one electrical signal of the drive system;
    processing the at least one electrical signal of the drive system;
    comparing the at least one electrical signal of the drive system with a baseline threshold;
    determining whether damage is present in the component based, at least in part, on the comparison, wherein the at least one electrical signal varying from the baseline threshold by a predetermined or on-line calculated amount is indicative of damage in the component;
    wherein, if the electrical signal does not exceed the baseline threshold, the method further comprises continuously monitoring at least one electrical signal of the pitch drive system; and
    wherein the method further comprises generating a signal indicative of damage in the pitch bearing and performing a maintenance of the pitch bearing based on the generated signal.

11. The method of claim 10, wherein the electrical signals comprise at least one of an electric current, a voltage, a torque component, a direct torque measurement, or a torque or current command.

12. The method of claim 10, wherein the component comprises a slewing ring bearing, the slewing ring bearing comprising at least one of a pitch bearing or a yaw bearing.

13. A system for detecting damage of a slewing ring bearing of a wind turbine, the slewing ring bearing being part of a drive control system having a plurality of drive motors, the system comprising:
    one or more sensors configured to measure at least one electrical signal of the drive control system; and
    a controller communicatively coupled with the one or more sensors, the controller comprising at least one processor configured to perform one or more operations, the one or more operations comprising:
        processing the at least one electrical signal of the drive system;
        comparing the at least one electrical signal of the drive system with a baseline threshold;
        determining whether damage is present in the slewing ring bearing based, at least in part, on the comparison, wherein the at least one electrical signal varying from the baseline threshold by a predetermined or on-line calculated amount is indicative of damage in the slewing ring bearing;
    wherein if the electrical signal does not exceed the baseline threshold, the method further comprises continuously monitoring the electrical signal of the drive system; and
    wherein the one or more operations further comprises generating a signal indicative of damage in the pitch bearing and conducting a maintenance of the pitch bearing based on the generated signal.

14. The system of claim 13, wherein the electrical signal comprises at least one of an electric current, a voltage, a torque component, a direct torque measurement, or a torque or current command.

15. The system of claim 13, wherein processing the electrical signal of the drive system further comprises retrieving a negative sequence component, comparing the negative sequence component with the baseline threshold, and determining whether damage is present in the slewing ring bearing based on the comparison, wherein if the negative sequence component exceeds the baseline threshold, damage is likely present in the slewing ring bearing.

16. The system of claim 13, wherein the slewing ring bearing comprises at least one of a pitch bearing or a yaw bearing.

17. The system of claim 16, wherein the drive control system comprises at least three pitch drive motors, each of the pitch drive motors configured with the pitch bearing and a rotor blade of the wind turbine.

18. The system of claim 13, wherein processing the electrical signal of the drive system further comprises at least one of determining a root-mean-square value for a plurality of electrical signals, averaging the electrical signals for each pitch drive motor over a predetermined or on-line calculated number of rotor rotations of the wind turbine, squaring each of the electrical signals, filtering each of the electrical signals, or multiplying each of the electrical signals.

* * * * *